United States Patent
Park et al.

(10) Patent No.: US 10,616,949 B2
(45) Date of Patent: Apr. 7, 2020

(54) METHOD FOR OPERATING IDLE MODE BY APPLYING EXTENDED DRX MODE IN WIRELESS COMMUNICATION SYSTEM, AND APPARATUS THEREFOR

(71) Applicant: LG ELECTRONICS INC., Seoul (KR)

(72) Inventors: Sangmin Park, Seoul (KR); Taehun Kim, Seoul (KR); Jaehyun Kim, Seoul (KR); Jinsook Ryu, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/751,397

(22) PCT Filed: Jul. 28, 2016

(86) PCT No.: PCT/KR2016/008283
§ 371 (c)(1),
(2) Date: Feb. 8, 2018

(87) PCT Pub. No.: WO2017/043767
PCT Pub. Date: Mar. 16, 2017

(65) Prior Publication Data
US 2018/0242388 A1      Aug. 23, 2018

Related U.S. Application Data

(60) Provisional application No. 62/262,873, filed on Dec. 3, 2015, provisional application No. 62/247,756, filed
(Continued)

(51) Int. Cl.
*H04W 76/28* (2018.01)
*H04W 52/02* (2009.01)
(Continued)

(52) U.S. Cl.
CPC ....... *H04W 76/28* (2018.02); *H04W 52/0216* (2013.01); *H04W 52/0245* (2013.01);
(Continued)

(58) Field of Classification Search
None
See application file for complete search history.

(56) References Cited

U.S. PATENT DOCUMENTS 9,648,515 B2 *   5/2017 Velev ................. H04Q 3/0045
2012/0252517 A1 *  10/2012 Karampatsis ......... H04W 60/04
                                                        455/515
(Continued)

FOREIGN PATENT DOCUMENTS

WO   2012093884 A2   7/2012
WO   2013168891 A1  11/2013
WO   2013169000 A1  11/2013

OTHER PUBLICATIONS

3GPP TS 24.301 V13.2.0, Jun. 26, 2015, 3rd Generation Partnership Project; Technical Specification Group Core Network and Terminals; Non-Access-Stratum (NAS) protocol for Evolved Packet System (EPS); Stage 3, Release 13, pp. 119-128.
(Continued)

*Primary Examiner* — Donald L Mills
(74) *Attorney, Agent, or Firm* — Dentons US LLP

(57) ABSTRACT

Disclosed herein are a method of operating in an extended discontinuous reception (eDRX) mode in an idle mode, including transmitting, to a network entity, a first message containing eDRX information for requesting operation in the eDRX mode, receiving, from the network entity, a second message corresponding to a response to rejection of the first message, the second message containing information indicating that the network entity is in a congested state as a cause of rejection of the first message, a time value for retransmitting the first message, and an eDRX parameter for
(Continued)

operation in the eDRX mode, and initiating operation in the eDRX mode based on the eDRX parameter, and an terminal for the same.

10 Claims, 11 Drawing Sheets

Related U.S. Application Data on Oct. 29, 2015, provisional application No. 62/236,152, filed on Oct. 2, 2015, provisional application No. 62/217,041, filed on Sep. 11, 2015.

(51) Int. Cl.
*H04W 76/18* (2018.01)
*H04W 60/02* (2009.01)
*H04W 74/08* (2009.01)

(52) U.S. Cl.
CPC ........ *H04W 60/02* (2013.01); *H04W 74/0833* (2013.01); *H04W 76/18* (2018.02); *Y02D 70/126* (2018.01); *Y02D 70/1224* (2018.01); *Y02D 70/1226* (2018.01); *Y02D 70/1242* (2018.01); *Y02D 70/1262* (2018.01); *Y02D 70/142* (2018.01); *Y02D 70/146* (2018.01); *Y02D 70/21* (2018.01); *Y02D 70/24* (2018.01); *Y02D 70/25* (2018.01)

(56) References Cited

U.S. PATENT DOCUMENTS

| | | | |
|---|---|---|---|
| 2015/0003308 A1* | 1/2015 | Jin | H04W 68/02 370/310 |
| 2015/0195782 A1 | 7/2015 | Terry et al. | |
| 2016/0242231 A1* | 8/2016 | Vajapeyam | H04W 24/08 |
| 2016/0266634 A1* | 9/2016 | Chuang | H04W 52/0258 |
| 2016/0295504 A1* | 10/2016 | Wang | H04W 52/02 |
| 2016/0345292 A1* | 11/2016 | Ljung | H04W 36/0083 |
| 2017/0325163 A1* | 11/2017 | Haneji | H04W 52/0229 |
| 2018/0234917 A1* | 8/2018 | Kim | H04W 48/08 |

OTHER PUBLICATIONS

International Search Report from PCT/KR2016/008283, dated Oct. 31, 2016.
Written Opinion of the ISA from PCT/KR2016/008283, dated Oct. 31, 2016.

\* cited by examiner

US 10,616,949 B2

METHOD FOR OPERATING IDLE MODE BY APPLYING EXTENDED DRX MODE IN WIRELESS COMMUNICATION SYSTEM, AND APPARATUS THEREFOR

This application is a 35 USC § 371 National Stage entry of International Application No. PCT/KR2016/008283 filed on Jul. 28, 2016, and claims priority to U.S. Provisional Application Nos. 62/217,041 filed on Sep. 11, 2015; 62/236,152 filed on Oct. 2, 2015; 62/247,756 filed on Oct. 29, 2015 and 62/262,873 filed on Dec. 3, 2015, all of which are hereby incorporated by reference in their entireties as if fully set forth herein.

TECHNICAL FIELD

The present disclosure relates to a wireless communication system and, more particularly, to a method of a user equipment (UE) applying an extended discontinuous reception (eDRX) mode in an idle mode in a wireless communication system and an apparatus for the same.

BACKGROUND ART

Wireless communication systems are widely deployed to provide various kinds of communication services such as voice and data services. Generally, these communication systems are multiple access systems capable of supporting communication with multiple users by sharing available system resources (e.g., bandwidth and transmit power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

DISCLOSURE

Technical Problem

An object of the present invention devised to solve the problem lies in reducing power consumption of a UE operating in the idle mode in a mobile communication system such as a 3GPP Evolved Packet System (EPS) by allowing the UE to efficiently apply eDRX.

Another object of the present invention is to minimize power consumption of a UE by allowing the UE to apply eDRX regardless of the state of the network.

Another object of the present invention is to reduce signaling overhead required for use of eDRX.

Objects of the present invention are not limited to the aforementioned objects, and other objects of the present invention which are not mentioned above will become apparent to those having ordinary skill in the art upon examination of the following description.

Technical Solution

The object of the present invention can be achieved by providing a method of operating in an idle mode, including transmitting, to a network entity, a first message containing extended discontinuous reception (eDRX) information for requesting operation in the eDRX mode, receiving, from the network entity, a second message corresponding to a response to rejection of the first message, the second message containing information indicating that the network entity is in a congested state as a cause of rejection of the first message, a time value for retransmitting the first message, and an eDRX parameter for operation in the eDRX mode, and initiating operation in the eDRX mode based on the eDRX parameter.

When the second message contains only the information indicating that the network entity is in the congested state and the timer value, the terminal may not operate in the eDRX mode.

The initiating of the operation in the eDRX mode may be performed along with initiation of a timer T3346 according to the timer value.

The first message may be a Tracking Area Update (TAU) request message, Routing Area Update (RAU) request message or Service Request (SR) message, wherein the second message may be a TAU reject message, RAU reject message or SR reject message.

When operation in the eDRX mode is pre-negotiated with the network entity before the transmitting of the first message, the eDRX information may contain an indicator for requesting that the negotiated parameter should continue to be used.

The initiating of the operation in the eDRX mode may be performed only when integrity protection is applied to the second message.

The method may further include transmitting, when the eDRX mode is desired to be stopped during operation in the eDRX mode, a third message containing an indicator indicating stop of the eDRX mode to the network entity.

In another aspect of the present invention, provided herein is a terminal operating in an extended discontinuous reception (eDRX) mode in an idle mode, including a transmitter, a receiver, and a processor configured to operate in connection with the transmitter and the receiver, wherein the processor is configured to transmit, to a network entity, a first message containing eDRX information for requesting operation in the eDRX mode, receive, from the network entity, a second message corresponding to a response to rejection of the first message, the second message containing information indicating that the network entity is in a congested state as a cause of rejection of the first message, a time value for retransmitting the first message, and an eDRX parameter for operation in the eDRX mode, and initiate operation in the eDRX mode based on the eDRX parameter.

Advantageous Effects

According to embodiments of the present invention, the following effects may be achieved.

First, a UE in the idle mode is allowed to initiate eDRX as desired. Thereby, power consumption of the UE may be reduced.

Second, an issue of failing to apply eDRX depending on the state of the network may be addressed. Thereby, signal overhead and network load may be lowered.

Third, various kinds of signaling for the eDRX operation of the UE may be designed. Thereby, efficient signaling may be implemented as needed by the network and the UE.

It will be appreciated by persons skilled in the art that that the effects that can be achieved through the embodiments of the present invention are not limited to those described above and other advantages of the present invention will be clearly understood from the following detailed description. That is, unintended effects according to implementation of the present invention may be derived by persons skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention. The technical features of the present invention are not limited to a specific drawing, and some of the features illustrated in the respective drawings may be combined to constitute a new embodiment. The reference numerals in the drawings represent structural elements. In the drawings.

BEST MODE

Figure 1:
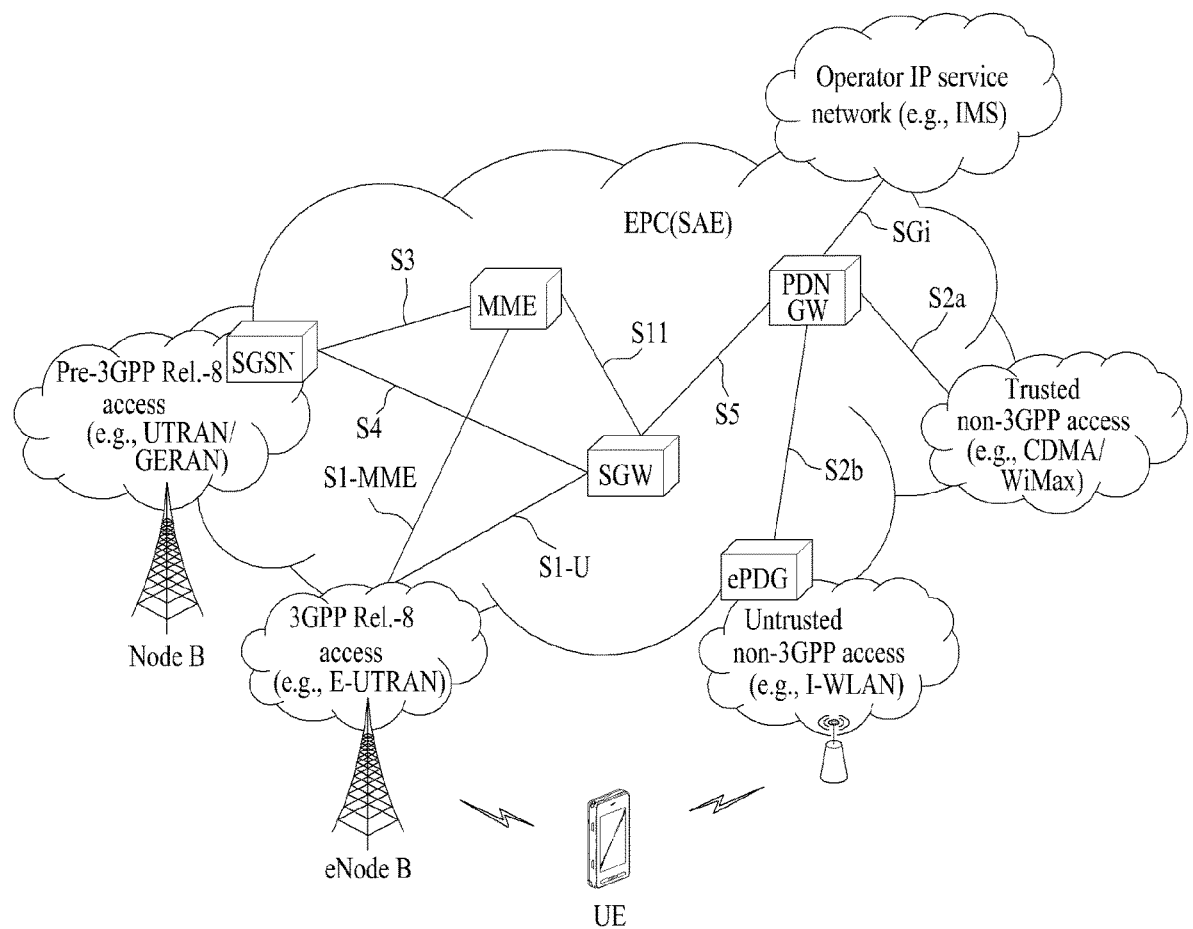
FIG. 1 is a schematic diagram showing the structure of an evolved packet system (EPS) including an evolved packet core (EPC)

Most of the terms used herein are general terms that have been widely used in the technical art to which the present invention pertains. However, definitions of the terms may vary depending on intentions of technicians in the art, precedent cases, or new technologies. Additionally, some of the terms used herein may be arbitrarily chosen by the present applicant. In this case, such terms are defined in detail below. Accordingly, the specific terms used herein should be understood based on the unique meanings thereof and in the context of the present invention.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some elements or features of one embodiment may be included in another embodiment and may be replaced with corresponding elements or features of another embodiment.

In the description of the drawings, procedures or steps which render the scope of the present invention unnecessarily ambiguous will be omitted and procedures or steps which can be understood by those skilled in the art will be omitted.

In the disclosure, "include" or "comprise" should be interpreted as meaning that other components may further be included, not excluded, unless otherwise specified. The terms "-unit", "-or(er)", "module", etc. signifies at least one function or operation processing unit that can be implemented in hardware, software, or a combination thereof. In addition, it is to be understood that the singular forms "a, "an", and "the" encompass the plural forms thereof unless context clearly dictates otherwise.

The embodiments of the present invention are supported by standard documents disclosed in at least one of the Institute of Electrical and Electronic Engineers (IEEE) 802.xx system, the 3rd generation partnership project (3GPP) system, the 3GPP long term evolution (LTE) system and the 3GPP2 system, all of which are wireless access systems. That is, the steps or the portions of the embodiments of the present invention which are not described in order to clarify the technical spirit are supported by the above-described documents.

All the terms disclosed in the present specification may be described based on the above-described standard documents. In particular, embodiments of the present invention can be supported by one or more of P802.16e-2004, P802.16e-2005, P802.16.1, P802.16p, and P802.16.1b standard documents that are standard documents of the IEEE 802.16 system.

Hereinafter, preferred embodiments of the present invention will be described with reference to the accompanying drawings. It is to be understood that the detailed description which will be disclosed along with the accompanying drawings is intended to describe the exemplary embodiments of the present invention, and is not intended to describe the only embodiments through which the present invention can be carried out.

Specific terms used in the following description are provided to facilitate the understanding of the present invention and may be replaced by other terms without departing from the technical scope of the present invention.

The terms used in this specification are defined as follows.

UMTS (Universal Mobile Telecommunications System): Global System for Mobile Communication (GSM)-based 3rd generation mobile communication technology developed by 3GPP.

EPS (Evolved Packet System): A network system configured by an EPC (Evolved Packet Core), which is an Internet Protocol (IP)-based packet switched (PS) core network and an access network such as LTE, UTRAN, etc. The EPS is evolved from UMTS.

NodeB: An eNB of GERAN/UTRAN which is installed outdoors and has coverage of a macro cell scale.

eNodeB: An eNB of E-UTRAN which is installed outdoors and has coverage of a macro cell scale.

UE (User Equipment): A user device. The UE may be referred to as a terminal, ME (Mobile Equipment), MS (Mobile Station), or the like. The UE may be a portable device such as a notebook computer, cellular phone, PDA (Personal Digital Assistant), smartphone, or multimedia device, or may be a nonportable device such as a PC (Personal Computer) and vehicle-mounted device. The term UE or terminal in the description of MTC may refer to an MTC device.

HNB (Home NodeB): A base station of a UMTS network. The HNB is installed indoors and has coverage of a micro cell scale.

HeNB (Home eNodeB): A base station of an EPS network. The HeNB is installed indoors and has coverage of a micro cell scale.

MME (Mobility Management Entity): A network node of the EPS network performing functions of Mobility Management (MM) and Session Management (SM).

PDN-GW (Packet Data Network-Gateway)/PGW: A network node of the EPS network performing functions of UE IP address allocation, packet screening and filtering, and charging data collection.

SGW (Serving Gateway)/S-GW: A network node of the EPS network performing functions of mobility anchor, packet routing, idle mode packet buffering, and triggering of the MME paging the UE.

PCRF (Policy and Charging Rule Function): An EPS network node that performs policy decision for dynamically applying the quality of service (QoS) and charging policy which are differentiated among service flows.

OMA DM (Open Mobile Alliance Device Management): a protocol designed to manage mobile devices such as cellular phones, PDAs, portable PCs, and the like. The protocol performs functions such as device configuration, firmware upgrade, and error reporting.

OAM (Operation Administration and Maintenance): a network management function group for indicating defects in the network and providing performance information, data and the diagnosis function.

NAS (Non-Access Stratum): An upper staratum of a control plane between the UE and the MME. The NAS is a functional layer for signaling between a UE and a core network and exchange of a traffic message between the UE and the core network in LTE/UMTS protocol stack. The NAS functions to support UE mobility, a session management procedure for establishing and maintaining IP connection between a UE and a PDN GW, and IP address management.

AS (Access Stratum): A layer including a protocol stack between a UE and a radio (or access) network and serving to transmit data and a network control signal.

NAS configuration MO (Management Object): an MO used in the procedure of configuring parameters associated with NAS functionality for the UE.

PDN (Packet Data Network): A network where a server (e.g., an MMS (Multimedia Messaging Service) server, a WAP (Wireless Application Protocol) server, etc.) supporting a specific service is located.

PDN connection: A logical connection between a PDN and a UE represented by one IP address (one IPv4 address and/or one IPv6 prefix).

APN (Access Point Name): A string indicating or identifying a PDN. A requested service or a network (PDN) is accessed through a specific P-GW and the APN is a name (string) (e.g., internet.mnc012.mcc345.gprs) predefined in the network to find the P-GW.

RAN (Radio Access Network): a unit including a NodeB, an eNodeB and an RNC (Radio Network Controller) for controlling the NodeB and the eNodeB in a 3GPP network. The RAN is present between units of UEs and provides connection to the core network.

HLR (Home Location Register)/HSS (Home Subscriber Server): a database containing subscriber information of a 3GPP network. The HSS can perform functions such as configuration storage, identity management and user state storage.

PLMN (Public Land Mobile Network): a network configured for the purpose of providing mobile communication services to individuals. This network may be configured per operator.

ANDSF (Access Network Discovery and Selection Function): one network entity providing a policy allowing each operator to discover and select access usable by the UE.

1. Evolved Packet Core (EPC)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e., second-generation or third-generation mobile communication systems), functions of a core network are implemented through a circuit-switched (CS) sub-domain for voice and a packet-switched (PS) sub-domain for data. However, in a 3GPP LTE system which evolved from the third generation communication system, CS and PS sub-domains are unified into one IP domain. That is, in 3GPP LTE, connection of terminals having IP capability can be established through an IP-based base station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and maintains a data path between an eNodeB and the PDN GW. When a terminal moves over an area served by an eNodeB, the SGW functions as a local mobility anchor point. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data for, for example, mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g., S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

Figure 3:
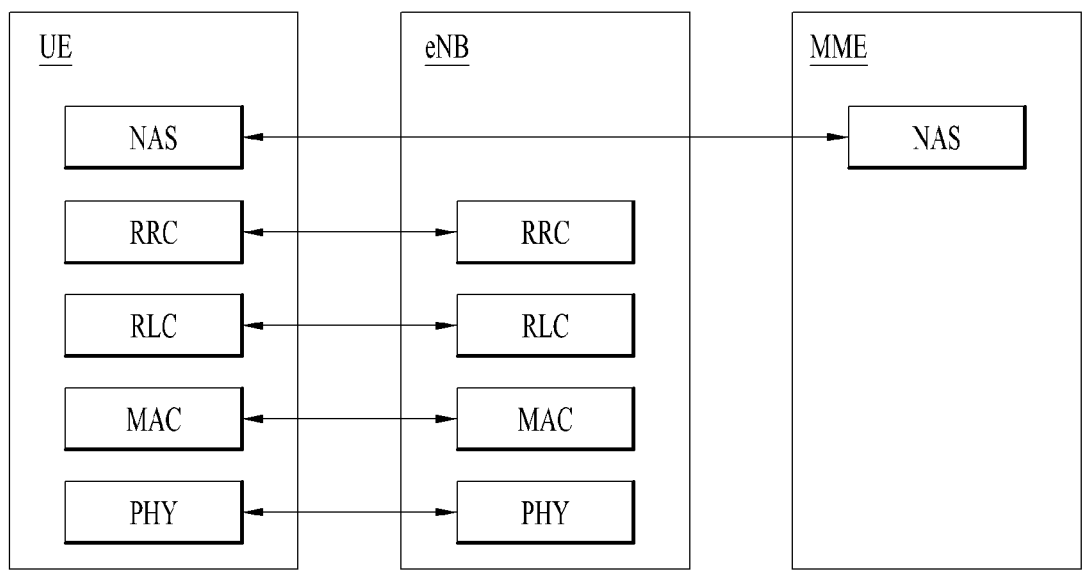
FIG. 3 is a diagram exemplarily illustrating the structure of a radio interface protocol in a control plane.
Figure 4:
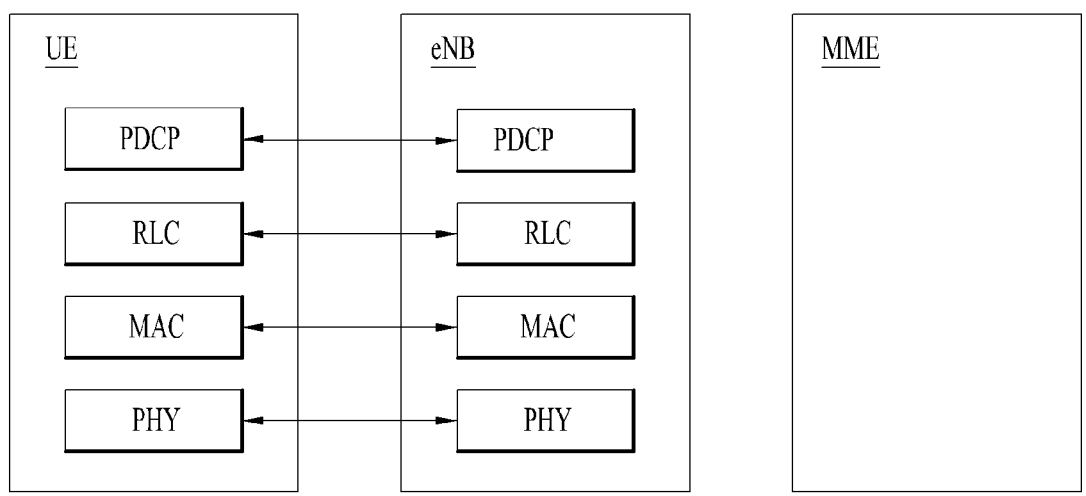
FIG. 4 is a diagram exemplarily illustrating the structure of a radio interface protocol in a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data and a control plane for delivering control signaling which are arranged vertically.

The protocol layers may be classified into a first layer (L1), a second layer (L2), and a third layer (L3) based on the three sublayers of the open system interconnection (OSI) model that is well known for the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel Data is transferred between the physical layer and the MAC layer through the transport channel Transfer of data between different physical

TABLE 1

| Reference point | Description |
|---|---|
| S1-MME | Reference point for the control plane protocol between E-UTRAN and MME |
| S1-U | Reference point between E-UTRAN and Serving GW for the per bearer user plane tunnelling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunnelling. |
| S5 | It provides user plane tunnelling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
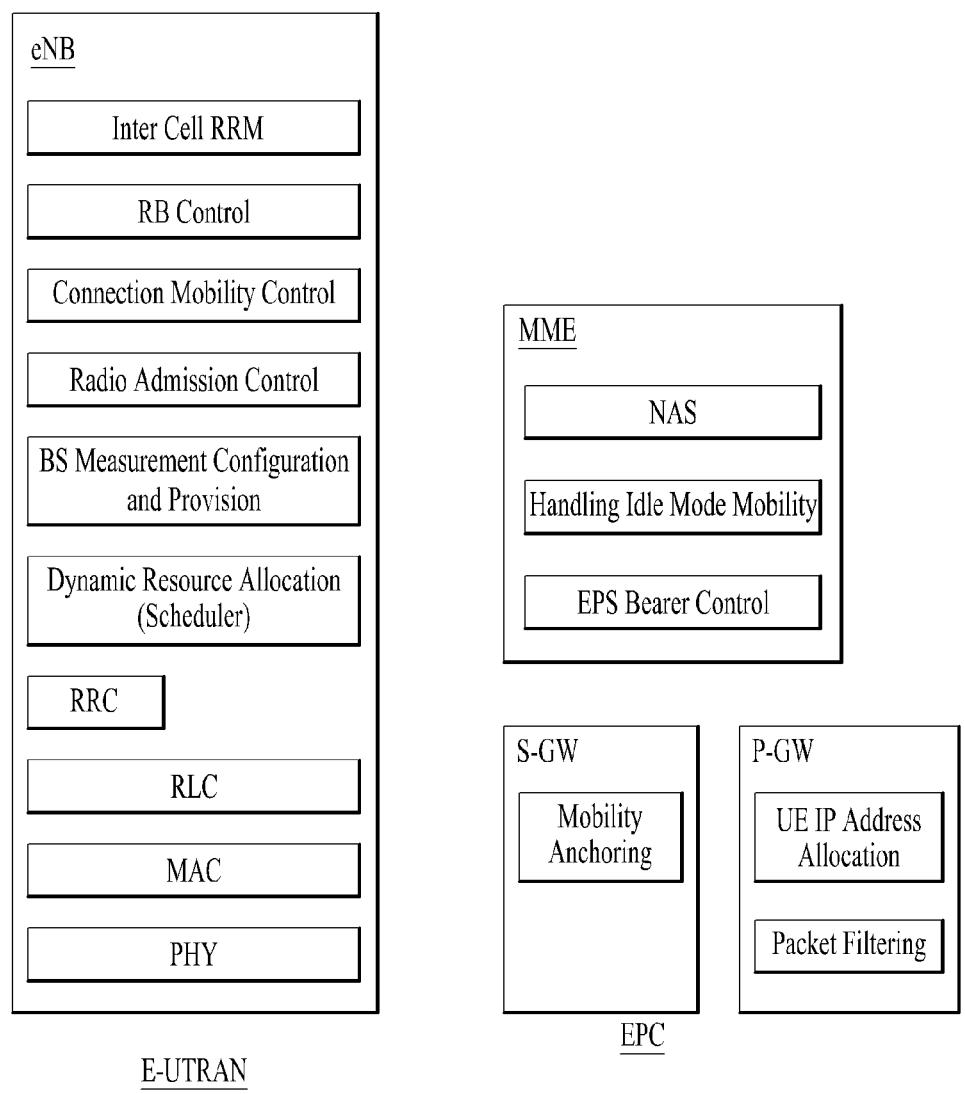
FIG. 2 is a diagram exemplarily illustrating architectures of a typical E-UTRAN and EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of OFDM symbols in the time domain and a plurality of subcarriers. One subframe consists of a plurality of resource blocks. One resource block consists of a plurality of OFDM symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels including a Physical Downlink Shared Channel (PDSCH) and a Physical Uplink Shared Channel (PUSCH) and control channels including a Physical Downlink Control Channel (PDCCH), a Physical Control Format Indicator Channel (PCFICH), a Physical Hybrid-ARQ Indicator Channel (PHICH), and a Physical Uplink Control Channel (PUCCH).

The second layer includes various layers. First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (referred to as, RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with typical mobile communication services such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE in the RRC_IDLE state selects a cell (again) and checks system information or paging information. This operation is called camping on a cell. Only when the UE in the RRC_IDLE state needs to establish RRC connection, does the UE establish RRC connection with the RRC layer of the E-UTRAN through the RRC connection procedure and transition to the RRC_CONNECTED state. The UE in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
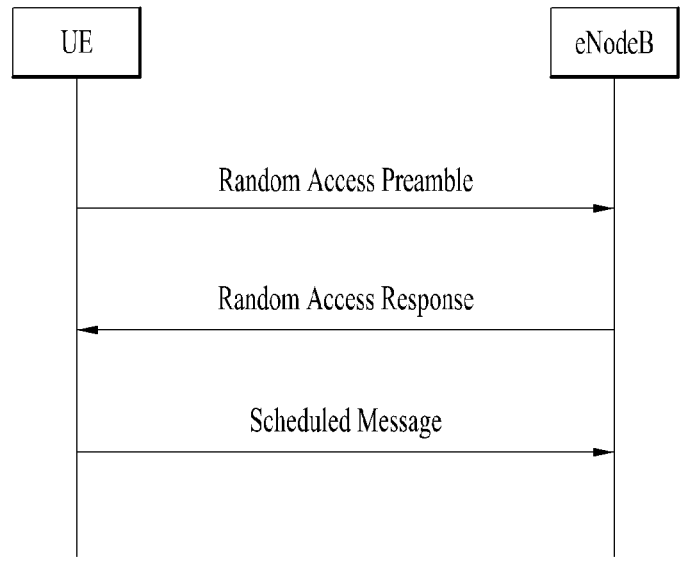
FIG. 5 is a flowchart illustrating a random access procedure.

FIG. 5 is a flowchart illustrating a random access procedure in 3GPP LTE.

The random access procedure is performed for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
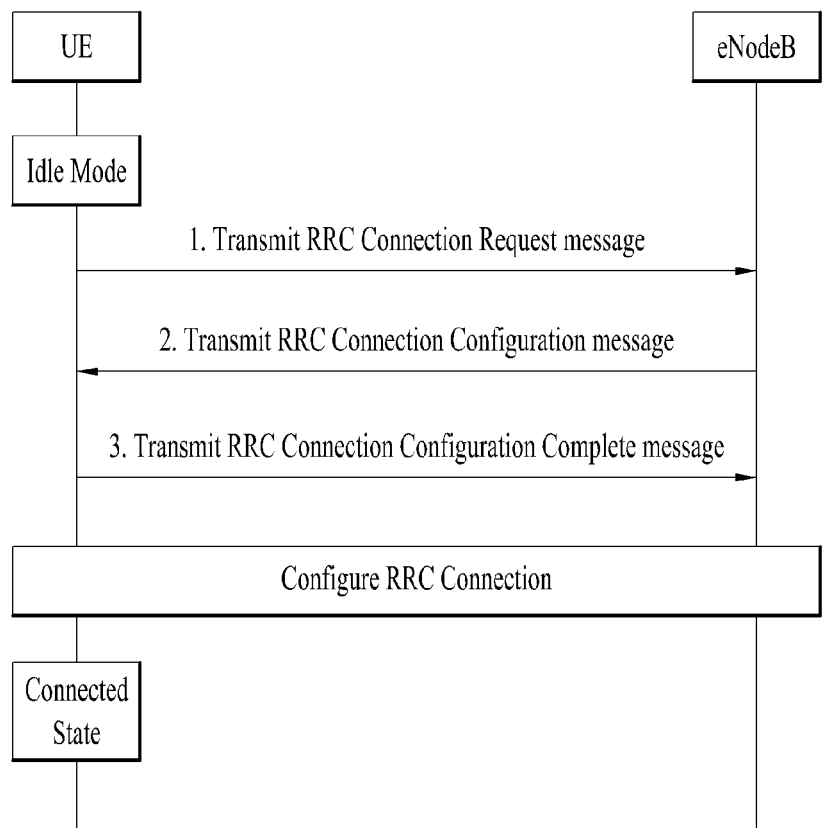
FIG. 6 is a diagram illustrating a connection procedure in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in the unit of a cell. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, does the UE establish RRC connection with the RRC layer of the eNodeB through the RRC connection procedure and then transition to the RRC connected state.

The UE in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNodeB and transition to the RRC connected mode.

2. DRX

Hereinafter, discontinuous reception (DRX) will be described.

In order to reduce consumption of battery power of a UE, the UE may perform a DRX operation and/or discontinuous transmission (DTX) operation. A UE performing DRX repeatedly turns on and off the reception performance thereof, and a UE performing DTX repeatedly turns on and off the transmission performance thereof. The present invention is associated with the DRX operation. Hereinafter, the DRX operation will be described in detail. Terms used in describing embodiments of the present invention related to the DRX operation are defined as follows.

Active Time: Time associated with DRX. A UE mentors a PDCCH in a PDCCH-subframe for the active time.
    mac-ContentionResolutionTimer: Parameter specifying the number of consecutive subframes in which a UE should monitor a PDCCH after Msg3 is transmitted.
    DRX Cycle: Parameter specifying periodic repetition of On Duration accompanied by a possible period of inactivity.
    drx-InactivityTimer: Parameter specifying the number of consecutive PDCCH-subframes after successful decoding of a PDCCH indicating initial UL or DL user transmission for a UE.
    drx-RetransmissionTimer: Parameter specifying the maximum number of PDCCH-subframes in which DL retransmission is expected by a UE.
    drxShortCycleTimer: Parameter specifying the number of consecutive subframes in which a UE should comply with a short DRX cycle.
    drxStartOffset: Parameter specifying a subframe in which the DRX cycle begins.
    HARQ RTT (Round Trip Time) timer: Parameter specifying the minimum number of subframes before DL HARQ retransmission is expected by a UE.
    Msg3: Message which is provided from a higher layer, associated with a UE contention resolution identity, and transmitted on an uplink shared channel (UL-SCH) including a C-RNTI medium access control (MAC) control element (CE) or a common control channel (CCCH) service data unit (SDU) as a part of a random access procedure.
    onDurationTimer: Parameter specifying the number of consecutive PDCCH-subframes at the start of DRX.
    PDCCH-subframe: Subframe having a PDCCH or subframe having an R-PDCCH for a relay node (RN) having an R-PDCCH which is configured but not suspended. The PDCCH-subframe may represent any subframe for an FDD UE behavior and may represent only a DL subframe and a subframe including DwPTS for a TDD UE behavior. For RNs having an RN subframe configuration which is configured but is not suspended, the PDCCH-subframe may represent all DL subframes configured for RN communication with E-UTRAN.

Once the aforementioned timers start, the timers run until they stop or expire. Otherwise, the timers do not run. The timers may start if they are not running, and may be resumed if they are running. The timers always start or restart from an initial value.

DRX refers to an operation mode of reducing battery power consumption of a UE by allowing the UE to discontinuously receive a DL channel. For example, once DRX is configured, a UE may attempt to receive a PDCCH only in a determined time interval, and does not attempt to receive the PDCCH during the other time intervals. The time interval in which the UE needs to attempt to receive the PDCCH is called the On Duration. The On Duration is defined once per DRX Cycle.

The UE attempts to receive a PDCCH at least during On Duration in one DRX cycle. The DRX cycle used at this time is divided into a long DRX cycle and a short DRX cycle according to the length thereof. The long DRX cycle, which represents a long period, may minimize battery power consumption of the UE, and the short DRX cycle, which represents a short period, may minimize data transmission delay.

If the UE receives a PDCCH during the On Duration, additional transmission or retransmission may occur in a time interval other than the On Duration. Accordingly, the UE should attempt to receive a PDCCH in a time interval where additional transmission or retransmission may occur even if the time interval is not the On Duration. That is, the UE attempts to receive a PDCCH in a time interval in which onDurationTimer for managing the On Duration, drx-InactivityTimer for managing inactivity or drx-RetransmissionTimer for managing retransmission is running. Additionally, when the UE is performing random access or attempts to receive a UL grant after sending a scheduling request, the UE attempts to receive a PDCCH carrying the UL grant. The time interval in which the UE should attempt to receive a PDCCH is called an activity time. The activity time includes On Duration, which is a time interval in which the UE periodically attempts to receive a PDCCH, and a time interval in which the UE attempts receive a PDCCH when an event occurs.

Figure 7:
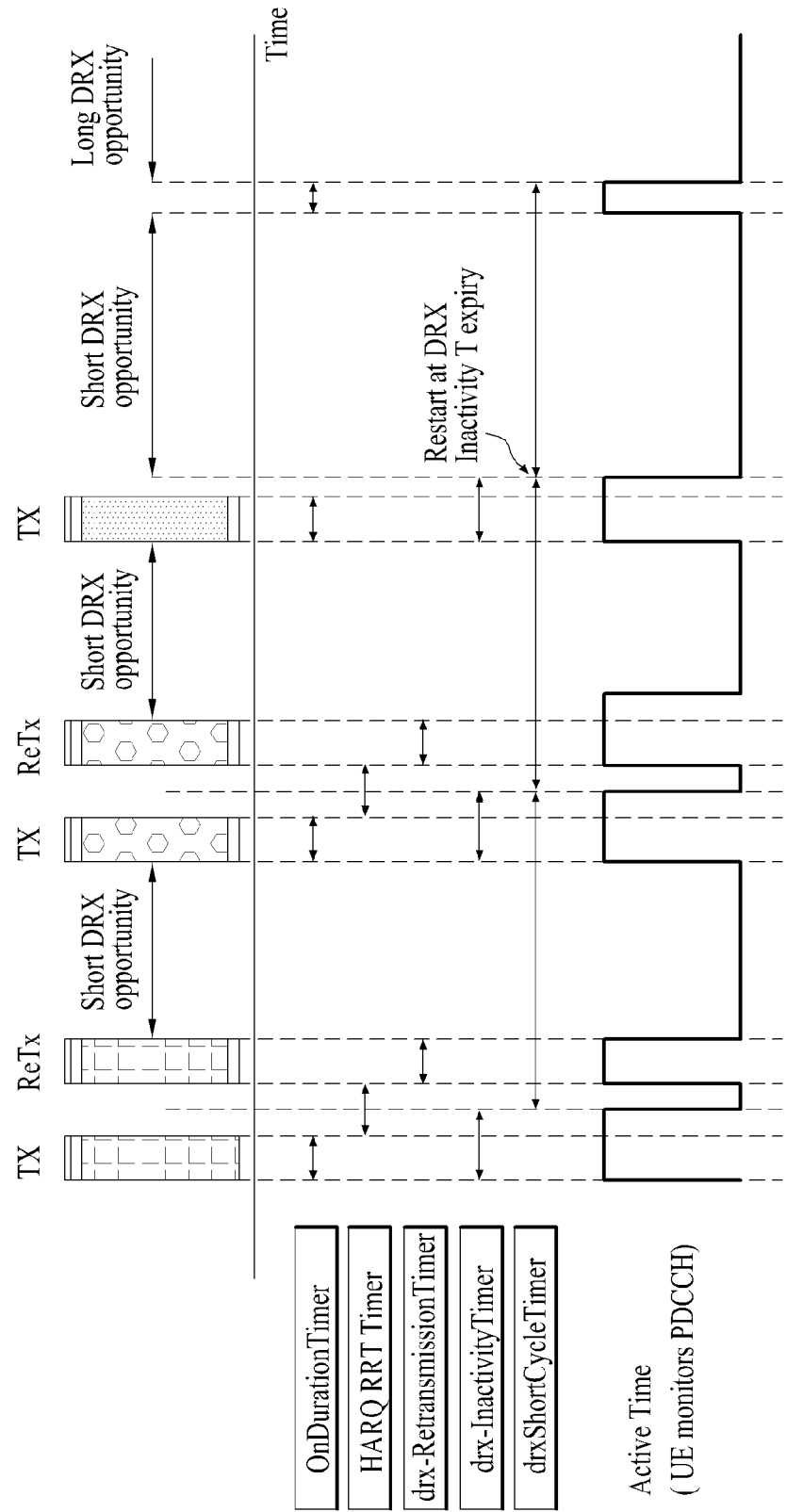
FIG. 7 illustrates a discontinuous reception (DRX) operation in a 3GPP LTE system.

FIG. 7 illustrates a discontinuous reception (DRX) operation in a 3GPP LTE system.

The UE may be configured by RRC with DRX functionality that controls the UE's PDCCH monitoring activity for a cell radio network temporary identifier (C-RNTI), which is unique identification information used to identify RRC connection and scheduling, a transmit power control-physical uplink control channel-RNTI (TPC-PUCCH-RNTI), which is identification information used to control power of PUCCH, a transmit power control-physical uplink shared channel-RNTI (TPC-PUSCH-RNTI), which is identification information used to control power of PUSCH, and semi-persistent scheduling C-RNTI (if configured), which is unique identification information used for semi-persistent scheduling. If DRX is configured in RRC_Connected, the UE is allowed to monitor the PDCCH discontinuously using the DRX operation. When using DRX operation, the UE discontinuously monitors PDCCH according to conditions which will be described later. RRC controls the DRX operation by configuring timers such as onDurationTimer, drx-InactivityTimer, drx-RetransmissionTimer, longDRX-Cycle, drx start offset, drxShortCycleTimer, and shortDRX-Cycle. A HARQ RTT timer per DL HARQ process is also defined. The HARQ RTT timer is set to 8 ms, and the other timer values (e.g., onDurationTimer, drx-InactivityTimer, drx-RetransmissionTimer or mac-ContentionResolution-Timer) are configured by the eNB through RRC signaling. The long DRX cycle and the short DRX cycle are also configured by the eNB through RRC signaling. Meanwhile, the eNB uses cqi-Mask, which has a value set by a higher layer (e.g., an RRC layer), to limit reporting of CQI/PMI/PTI/RI from the UE to On Duration of the DRX Cycle. The eNB may transmit a DRX Command MAC CE to the UE to command the UE to transition to the DRX state. As described below, upon receiving the DRX Command MAC CE from the eNB, the UE transitions to a short DRX state if a short DRX cycle is configured. Otherwise, the UE transitions to a long DRX state. The DRX Command MAC CE is identified through the logical channel ID (LCID) of a MAC PDU subheader.

When a DRX cycle is configured, the activity time includes the following time intervals:
 a time for which onDurationTimer, drx-InactivityTimer, drx-RetransmissionTimer or mac-ContentionResolutionTimer runs;
 a time for which a scheduling request is transmitted over a PUCCH and is pending;
 a time for which a UL grant for pending HARQ retransmission may occur and a corresponding HARQ buffer has data; or
 a time taken until a PDCCH instructing initial transmission of new data corresponding to the C-RNTI of the UE is received after successful reception of a random access response to a preamble which is not selected by the UE.

When DRX is configured, the UE should perform the following operations for each subframe:

- If the HARQ RTT timer expires in this subframe and the data in a soft buffer of the corresponding HARQ process is not successfully decoded,
 - - the UE starts the drx-RetransmissionTimer for the corresponding HARQ process;
- If a DRX Command MAC control element is received,
 - - onDurationTimer is stopped; and
 - - drx-InactivityTimer is stopped;
- If drx-InactivityTimer expires or a DRX Command MAC CE is received in this subframe:
 - - when the Short DRX Cycle is configured:
 - - - drxShortCycleTimer starts or restarts;
 - - - the Short DRX Cycle begins.
 - - Else,
 - - - a Long DRX Cycle is used.
- If drxShortCycleTimer expires in this subframe,
 - - the Long DRX Cycle is used.
- If the Short DRX Cycle is used and [(SFN*10)+subframe number] modulo (shortDRX-Cycle)=(drxStartOffset) modulo (shortDRX-Cycle); or
 - if the Long DRX Cycle is used and [(SFN*10)+subframe number] modulo (longDRX-Cycle)=drxStartOffset,
 - - the UE starts onDurationTimer.
- For a PDCCH-subframe, if the subframe is neither required for uplink transmission for half-duplex FDD UE operation, nor a part of a configured measurement gap during the Active Time,

- - the UE monitors the PDCCH.
- - If the PDCCH indicates DL transmission or DL assignment has been configured for this subframe,
- - - the UE starts the HARQ RTT Timer for the corresponding HARQ process; and
- - - the UE stops the drx-RetransmissionTimer for the corresponding HARQ process.
- - If the PDCCH indicates new (DL or UL) transmission,
- - - the UE starts or restarts drx-InactivityTimer.
- When the UE is not in the Active Time, type-0-triggered SRS should not be reported.
- If CQI masking (cqi-Mask) is set up by a higher layer,
- - when onDurationTimer is not running, CQI (Channel Quality Indicator)/PMI (Precoding Matrix Indicator)/RI (Rank Indicator)/PTI (Precoding Type Indicator) on PUCCH should not be reported.
- Else,
- - when the UE is not in the Active Time, CQI/PMI/RI/PTI on PUCCH should not be reported.

Regardless of whether or not the UE is monitoring the PDCCH, the UE receives and transmits HARQ feedback and transmits a type-1-triggered SRS when the PDCCH is expected.

NOTE: The UE may optionally choose not to send CQI/PMI/RI/PTI reports on PUCCH and/or type-0-triggered SRS transmission for up to 4 subframes following a PDCCH indicating new (UL or DL) transmission. Choosing not to send CQI/PMI/RI/PTI reports on PUCCH and/or type-0-triggered SRS transmission is not applicable to subframes in which onDurationTimer is running.

NOTE: The same active time is applied to resources operating on all activated serving carriers.

2.1 Extended Idle Mode DRX (eDRX)

In LTE Rel-13, eDRX having a longer cycle than the legacy DRX is under discussion. To negotiate use of eDRX, the UE transmits an eDRX parameter to the MME (or SGSN) through an attach procedure or Tracking Area Update/Routing Area Update (TAU/RAU) procedure. The MME/SGSN may grant the request of the UE to activate eDRX or reject the request to deactivate eDRX. Even if the UE is operating in the eDRX mode, the UE should transmit an eDRX parameter to the MME through an attach request message or TAU/RAU request message to continue to use eDRX.

Figure 8:
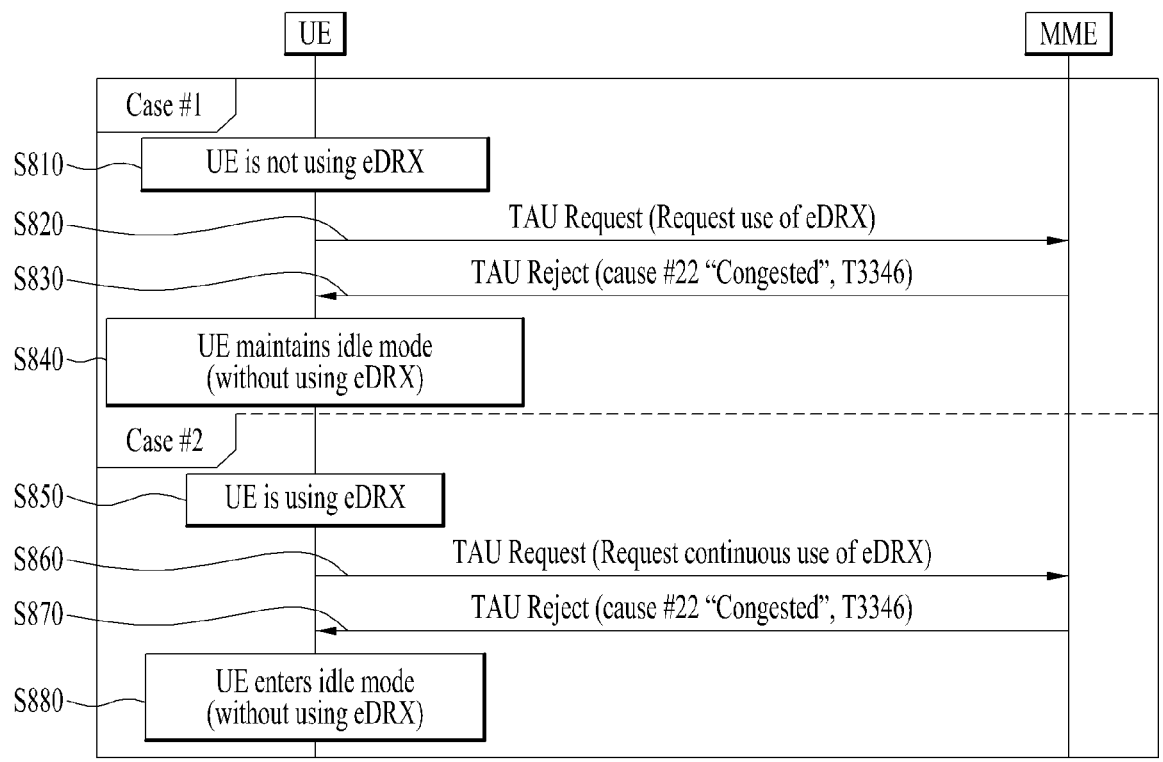
FIG. 8 illustrates the problem of the legacy extended idle mode DRX (eDRX) operation.

FIG. 8 illustrates the problem of the legacy extended idle mode DRX (eDRX) operation.

When the network is in a congested state, the network transmits a reject message containing Cause #22 indicating network congestion and a Mobility Management (MM) backoff timer T3346 value for EMM/GMM messages such as the attach request, TAU and RAU. Herein, if the value of the timer T3346 Information Element (IE) included in the reject message is 0 or is not deactivated, the UE starts the timer by setting the value of T3346 IE to a predetermined backoff timer value. Until the T3346 expires, the UE cannot transmit an EPS Mobility Management (EMM)/GPRS Mobility Management (GMM) request.

According to the description above, in order for the UE to reduce power consumption, the UE should be granted the eDRX (or PSM) operation by the network through an attach request message or TAU/RAU request message. If the network grants the eDRX operation, the network transmits, to the UE, an attach grant message or TAU/RAU grant message containing eDRX-related parameter/indicator/information.

On the other hand, if the network rejects the eDRX operation, the UE cannot perform the eDRX operation. If the network rejects the request message irrespective of the eDRX operation, the UE cannot operate in the eDRX mode even if the UE has requested the eDRX operation. Details will be described with reference to FIG. 8.

In Case #1 of FIG. 8, if the UE is not using eDRX (S810), the UE transmits a TAU request message to the MME to operate for eDRX (S820). If the network is in a congested state, the MME transmits, to the UE, a TAU reject message, which contains a timer T3346 value and Cause #22 indicating that the request has been rejected due to network congestion (S830). In this case, the TAU reject message is transmitted by the network due to network congestion although there is no reason to prohibit the eDRX operation of the UE. Despite transmission of the TAU reject message, the UE maintains operation in the idle mode without using eDRX because the UE has not been granted the eDRX operation by the MME (S840).

In Case #2 of FIG. 8, if the UE is using eDRX (S850), the UE transmits a TAU request message to the MME to continue to use eDRX (S860). Similarly, if the network is in a congested state, the MME transmits, to the UE, a TAU reject message, which contains Cause #22 and a timer T3346 value (S870). Similar to Case #1, the network transmits a TAU reject message due to congestion of the network although there is no reason to prohibit the eDRX operation of the UE. Thereby, the UE enters the idle mode without using eDRX (S880).

If the UE transmits a service request message as Mobile Originated (MO) data is generated or paging is received during the eDRX operation of the UE in the idle mode in contrast with the case illustrated in FIG. 8, a similar issue may be raised. If the network is in a congested state, the network transmits, to the UE, a service request reject message containing Cause #22 and a T3346 value, and the UE is not allowed to operate for eDRX anymore even if the network has not explicitly rejected eDRX. Thereby, the UE enters the EMM/GMM idle mode, in which the UE does not use eDRX. Further, the UE cannot transmit a new EMM/GMM request message until the timer expires.

As described above, if the network is in the congested state, the UE cannot operate for eDRX, but may persistently consume power until the timer T3346 expires even if the UE requests eDRX. In addition, since the UE should transmit a new message to the network at the time of expiration of the backoff timer to use eDRX, signaling overhead may unnecessarily increase.

As another issue, if the UE transmits a TAU request message in an NAS interval in which encryption is not applied, a fake eNB may intercept the TAU request message to which encryption has not been applied and check the contents of the message. In this case, if the fake eNB arbitrarily transmits the TAU reject message to the UE, the UE may incorrectly operate. This is because the UE can allow the TAU reject message even if integrity protection is not applied to the reject message.

As another issue, if the UE transmits a request message containing an eDRX parameter in every TAU/RAU, and receives a grant from the network, the UE may need to exchange parameters with the MME in every TAU/RAU even if the eDRX parameter in use is not changed. This procedure may add unnecessary overhead. In particular, since parameters for eDRX should be transmitted even when the TAU/RAU is an event-based TAU/RAU, not a periodic TAU/RAU, a serious issue may be raised in a situation where the capacity of the network is limited.

In particular, if the portion of signaling is large relative to the total transfer amount as in the case of cellular IoT (cIoT), exchanging a parameter of a few bytes to tens of bytes each time may be a great burden. In the case of cIoT, even if the same support technology (capacity) is very likely to be provided for TA/RA for the same operator, exchanging eDRX parameters through TAU/RAU according to change of TA/RA each time may result in unnecessary overhead.

3. Proposed Method of UE Operating in Idle Mode

Hereinafter, methods to address the aforementioned issues will be described with reference to FIGS. 9 to 12. In particular, embodiments of a method for operating the UE in the idle mode using eDRX will be described in detail.

Specifically, description will be given of a method of minimizing power consumption of a UE requesting operation for eDRX by allowing the UE to start eDRX even if the UE receives Cause #22 and a T3346 timer value due to congestion of the network. The UE may receive paging before the timer T3346 expires. If both the UE and the network support eDRX, and there is no reason to prohibit use of eDRX, applying eDRX during application of backoff according to the timer is advantageous in terms of power consumption of the UE. In the following description, an "eDRX mode" refers to an EMM-IDLE mode in which the UE operates for eDRX (or uses eDRX).

3.1 Embodiment 1

An embodiment of application of eDRX through a service request (SR) will be described first. In the conventional operation, the network is allowed to grant application of eDRX only through an attach grant message or TAU/RAU grant message containing eDRX parameters. However, as described above regarding the aforementioned issues, if a request for an SR transmitted during eDRX is rejected by the network due to the congested state of the network, eDRX cannot be maintained anymore.

To address this issue, the following embodiment is proposed. A UE having received an eDRX-related parameter through the most recent attach procedure or TAU/RAU procedure which was successfully performed may need to switch from the eDRX mode to a connected mode for reasons such as generation of MO data or reception of Mobile Terminated (MT) paging. The UE transmits an SR to the network, but the MME rejects the SR because of the current congested state of the network.

According to an embodiment, in this case, the UE may continue to use eDRX that has been used. The UE may continue to operate in the eDRX mode until T3346 of the reject message for the SR expires or the UE requests new eDRX through the next EMM/GMM procedure request. Of course, this embodiment is applicable only when the UE is using eDRX at the time when the UE requests the SR.

According to another embodiment, the network may transmit a reject message containing a new eDRX parameter regardless of the remaining part of the existing eDRX period. This new eDRX parameter/indicator/IE may be transmitted only when the SR reject message contains a T3346 value. For the eDRX parameter transmitted from the network to the UE, the same value as included in an eDRX parameter previously used by the UE may be included or a new eDRX parameter may be included.

If a field for granting use of eDRX is added to the eDRX-related parameter/indicator/IE, the network may transmit, to the UE, only bits of the field without other values related to eDRX. In this case, eDRX-related parameters previously negotiated between the UE and the network are used for the UE to operate for eDRX.

The SR reject message described above may be configured as shown in Table 2. The eDRX parameter may contain various kinds of information such as a parameter/indicator which are required for operation and use of eDRX.

TABLE 2

| IEI | Information Element | Type/Reference | Presence | Format | Length |
|---|---|---|---|---|---|
| | Protocol Discriminator | Protocol Discriminator 9.2 | M | V | ½ |
| | Security header type | Security header type 9.3.1 | M | V | ½ |
| | Service reject message identity | Message type 9.8 | M | V | 1 |
| | EMM cause | EMM cause 9.9.3.9 | M | V | 1 |
| 5B | T3442 value | GPRS timer 9.9.3.16 | C | TV | 2 |
| 5F | T3346 value | GPRS timer 2 9.9.3.16A | O | TLV | 3 |
| | eDRX parameters | | O | | |

3.2 Embodiment 2

Next, a description will be given of an embodiment of application of eDRX through the TAU/RAU procedure. As described above, if the UE requests TAU/RAU to operate for eDRX, but receives a TAU/RAU reject message due to congestion of the network, the UE is not allowed to use eDRX.

To address this issue, the following embodiment is proposed. When the UE requests a periodic TAU/RAU or a TAU/RAU triggered by an event, the UE transmits a TAU/RAU request message containing an eDRX-related parameter to the network in order to use eDRX in the next period. The network transmits a TAU/RAU reject message for the TAU/RAU request of the UE due to the congested state of the network although the network is applying a policy to support eDRX and allow the UE for eDRX. In this case, the TAU/RAU reject message contains EMM/GMM Cause #22 and a timer T3346 value.

According to the proposed embodiment, the MME may transmit a TAU/RAU reject message containing an eDRX-related parameter/indicator/IE. This procedure may be applied only when the transmitted TAU/RAU reject message contains Cause #22 and a timer T3346 value. The eDRX-related information contained in the eDRX parameter/indicator/IE may be set to the same value as included in the TAU/RAU request message transmitted from the UE, or a new eDRX parameter/indicator/IE may be configured and included in the TAU/RAU reject message by the network. Alternatively, the MME may transmit, through the TAU/RAU reject message, only an indicator indicating that the value requested by the UE will be used. If the UE is using eDRX in this case, the UE operates in the eDRX mode using the previously negotiated values.

The TAU reject message according to the proposed embodiment above may be configured as shown in Table 3. Similar to Table 2, the eDRX parameter field included in the TAU reject message of Table 3 may include various kinds of information such as a parameter/indicator required for operation and use of eDRX. Although Table 3 shows only the TAU reject message, it will be appreciated by those skilled in the art that the RAU reject message may also be configured in a similar manner.

TABLE 3

| IEI | Information Element | Type/Reference | Presence | Format | Length |
|---|---|---|---|---|---|
| | Protocol Discriminator | Protocol Discriminator 9.2 | M | V | ½ |
| | Security header type | Security header type 9.3.1 | M | V | ½ |
| | Tracking area update reject message identity | Message type 9.8 | M | V | 1 |
| | EMM cause | EMM cause 9.9.3.9 | M | V | 1 |
| 5F | T3346 value | GPRS timer 2 9.9.3.16A | O | TLV | 3 |
| A- | Extended EMM cause | Extended EMM cause 9.9.3.26A | O | TLV | 1 |
| | eDRX parameters | | O | | |

Figure 9:
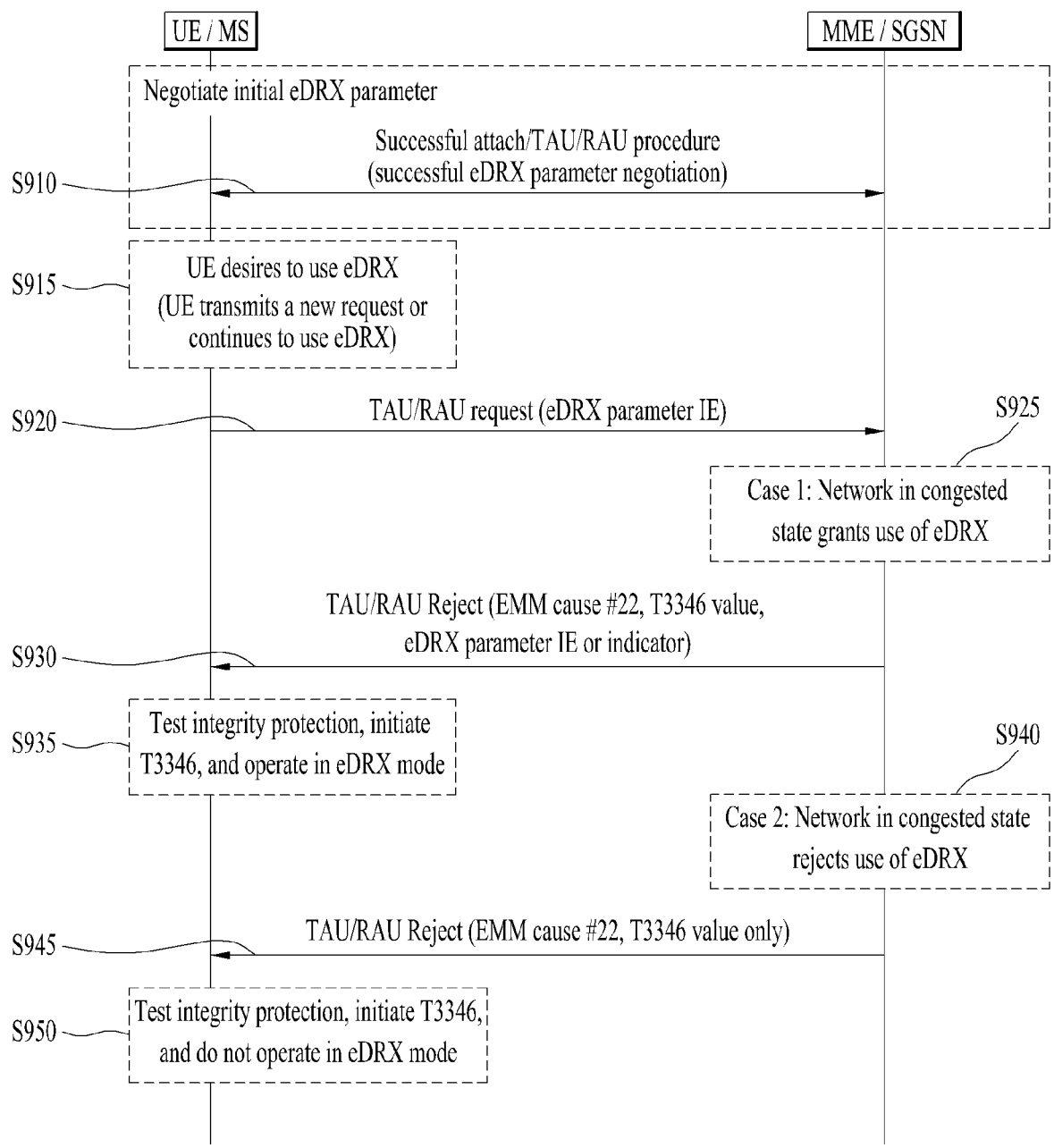
FIGS. 9 to 12 are flowcharts illustrating methods for a UE to operate in the idle mode according to a proposed embodiment.

FIG. 9 illustrates the embodiment described above according to a time series flow. In FIG. 9, the UE may have negotiated the eDRX parameter with the network (MME) through a successful attach procedure or TAU/RAU procedure (S910), and may or may not be operating for eDRX.

The UE determines to reduce power consumption by operating in the eDRX mode according to determination of an operation system or higher layer (S915). If the UE has not been using eDRX, the UE requests eDRX. If the UE has been using eDRX, the UE determines to continue to use eDRX. The processor of the UE initiates a TAU/RAU procedure based on this determination.

The UE generates a TAU/RAU request message and transmits the same to the MME (S920). The TAU/RAU request message transmitted to the MME includes parameters or values required for the eDRX operation in an extended DRX parameters IE. This transmission procedure is performed through a procedure in which the transmitter of the UE configures an AS interval and transmits a signal to the MME.

The MME receives the TAU/RAU request of the UE from the S1-AP layer and decodes the same to check the ID of the UE and the details of the request. In this case, since the network is in the congested state, the MME should reject TAU/RAU, and may grant or reject the eDRX operation separately from rejection of the TAU/RAU.

If the MME grants use of eDRX to the UE (S925), the MME may instruct the UE to operate in the eDRX mode when the MME transmits a TAU/RAU reject message to the UE. In this procedure, the MME may determine whether the eDRX-related parameters requested by the UE through S920 are proper or need to be changed. In addition, the MME may transmit, through the TAU/RAU reject message, an indicator indicating that the value requested by the UE will be used, a eDRX-related parameter or value requested by the UE, or a new eDRX-related parameter or value (S930).

The TAU/RAU reject message of S930 contains EMM Cause #22 and timer T3346 to signal the congested state of the network. Additionally, the TAU/RAU reject message may contain an eDRX-related parameter IE for configuring the eDRX parameter requested by the UE or a new eDRX parameter for the UE and an indicator indicating that the eDRX-related parameter requested by the user shall be used.

The UE receives and decodes the TAU/RAU reject message from the MME and then initiates the timer T3346 since the message contains EMM Cause #22 and the timer T3346. Since the eDRX-related parameter IE or indicator is contained in the TAU/RAU reject message, the UE starts to operate in the eDRX mode as it initiates T3346 (S935).

The MME may reject the eDRX operation in response to the TAU/RAU request of the UE (S940) In this case, the procedure of the MME transmitting, to the UE, Cause #22 and the timer T3346 in a TAU/RAU reject message is the same as that of S930, but the MME includes neither an eDRX-related parameter nor an indicator in the TAU/RAU reject message (S945). The UE recognizes that the network has not granted the eDRX mode, and thus does not operate in the eDRX mode (S950).

According to another proposed embodiment, in contrast with the procedure described above, the MME may implicitly allow eDRX for the UE through the TAU/RAU reject message. That is, the MME may allow eDRX without additional information rather than explicitly including an eDRX-related parameter in the TAU/RAU reject message.

Figure 10:
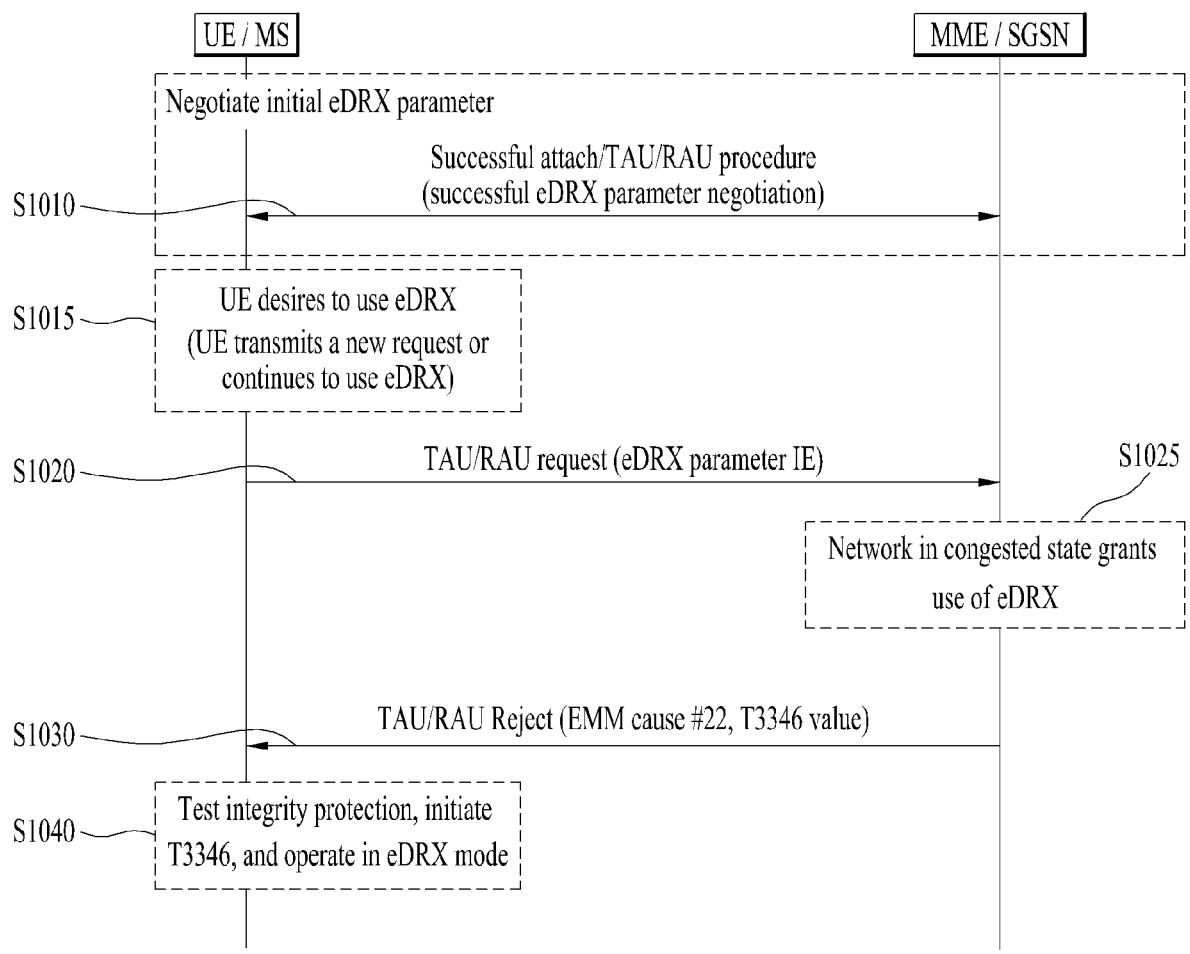

Details will be described with reference to FIG. 10. In FIG. 10, S1010 to S1025 may be similar to S910 to S925, and thus a detailed description thereof will be omitted. When the MME grants the eDRX operation to the UE and transmits a TAU/RAU reject message to the UE, the MME may include only EMM Cause #22 and a timer T3346 value in the message, but may not include an eDRX-related parameter/indicator/IE in the message (S1030). If EMM Cause #22 and the timer T3346 are contained in the TAU/RAU reject message, the UE may operate in the eDRX mode even if there is no additional information related to eDRX. In this case, if the UE is operating in the eDRX mode in S1015, the UE may use the eDRX parameter which has been previously used (S1040). If the UE is not operating in the eDRX mode, the UE may operate in the eDRX mode using the eDRX parameter request in S1020.

According to the embodiment proposed in FIG. 10, since an additional bit or field need not be configured for the MME to grant operation of the UE in the eDRX mode, signaling overhead may be reduced.

An issue related to a fake eNB which may be raised in the conventional art has been described above. In this proposed embodiment, as a method to address this issue, integrity protection may be applied to the TAU/RAU reject message if an eDRX-related parameter/indicator/IE is contained in the TAU/RAU reject message. If secure connection has not been established for reasons such as change of the PLMN, integrity protection may not be applied to the TAU/RAU reject message or the secure connection procedure may be performed until a new security context is exchanged to apply integrity protection.

If the received TAU/RAU reject message contains an eDRX-related parameter/indicator/IE, the UE may operate in the eDRX mode only if integrity protection is applied to the TAU/RAU reject message. That is, application of integrity protection to the TAU/RAU reject message may serve as an additional condition under which the UE may operate in the eDRX mode.

3.3 Embodiment 3

Even if the UE is using eDRX, the UE should transmit a TAU/RAU request message containing eDRX-related parameters to the MME in every TAU/RAU, and be granted eDRX by the network, as described above. In this embodiment, a method to reduce signaling overhead of exchanging eDRX parameters for the eDRX operation in every TAU/RAU will be proposed. The embodiment will be described in detail with reference to FIGS. 11 and 12.

If the UE intends to continue to use the values which have been used by that time without changing the eDRX-related parameter/indicator/IE, the UE may transmit, to the MME, a TAU/RAU request message containing only a new indicator indicating that the UE will use the previously negotiated values rather than a TAU/RAU request message containing all values of the eDRX-related parameter/indicator/IE. The network may transmit, to the UE, an indicator for granting use of the previously negotiated values in response. If the network instructs use of a new value, the network configures a new parameter/indicator/IE and transmits the same to the UE as in the previous cases.

The new indicator transmitted from the UE to the MME in this embodiment means that "the UE operates in the eDRX mode using a value which has most recently been successfully negotiated". This indicator may be defined and included in the TAU/RAU request message or TAU/RAU grant message as a new IE, or may be included in the existing IE as an additional bit (e.g., the indicator may be added to a predefined field, such as the additional update type or additional update result, as a new bit).

In the case where the MME transmits, to the UE, a TAU/RAU reject message containing Cause #22 and the timer T3346, the MME may transmit the new indicator to the UE through the TAU/RAU reject message. If the new indicator is received, the UE may operate in the eDRX mode during backoff, using the previously negotiated values.

Figure 11:
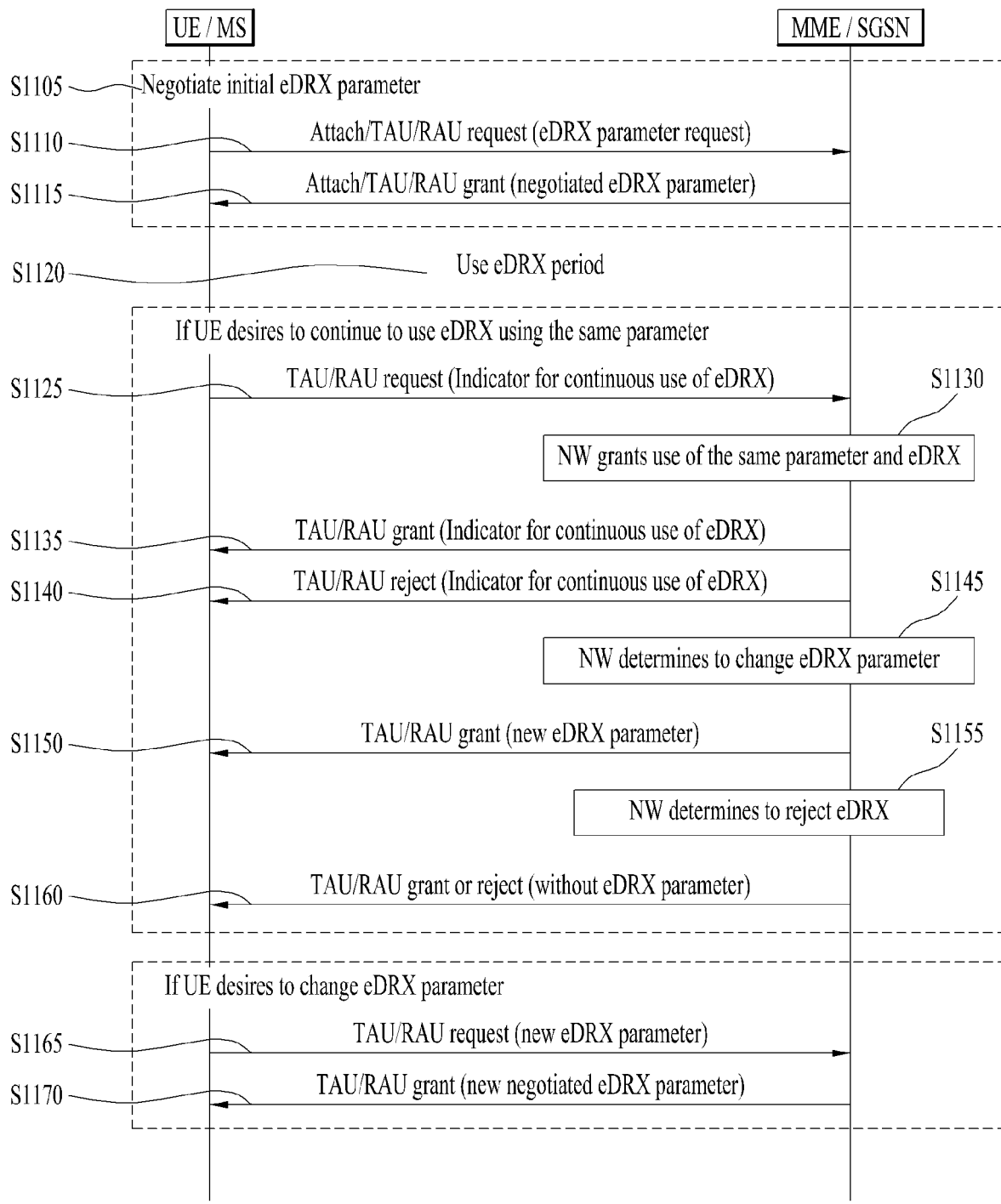

FIG. 11 illustrates the proposed embodiment according to a time series flow. The UE may negotiate initial eDRX parameters with the MME (S1105), and the negotiation procedure may be performed according to a successful attach procedure or TAU/RAU procedure (S1110, S1115). The UE operates in the eDRX mode according to the eDRX period using the negotiated parameters (S1120).

According to this embodiment, if the UE intends to continue to operate in the eDRX mode using the pre-negotiated parameters, the UE transmits, to the MME, a TAU/RAU request message containing an indicator indicating that the pre-negotiated eDRX parameters will continue to be used (S1125).

Upon receiving the TAU/RAU request message, the MME grants use of eDRX with the same parameters (S1130). In the case where the MME transmits a TAU/RAU grant message to the UE as network congestion does not occur in the MME, the MME may transmit, through the TAU/RAU grant message, an indicator indicating that the negotiated eDRX parameters will be used without change thereof (S1135). If network congestion occurs in the MME, and thus the MME transmits a TAU/RAU reject message (containing Cause #22 and the timer T3346) to the UE, the MME may still include, in the message, the indicator indicating that the negotiated eDRX parameters will be used without change thereof (S1140).

On the other hand, if the MME determines to change the eDRX parameters despite the request from the UE (S1145), the MME transmits, to the UE, a new eDRX parameter through the TAU/RAU grant message (S1150). If the MME determines to reject the eDRX operation of the UE (S1155), the MME transmits, to the UE, a TAU/RAU grant message or TAU/RAU reject message (S1160). In this case, the TAU/RAU grant message or TAU/RAU reject message does not contain an eDRX-related parameter. That is, the UE may operate in the eDRX mode only when the UE directly receives the indicator indicating that the negotiated value will be used without change thereof or an eDRX parameter.

If the UE desires to change the eDRX parameter, the UE may transmit a new eDRX parameter to the MME through the TAU/RAU request message to perform a new negotiation procedure (S1165, S1170).

Hereinafter, a simpler embodiment than the previous embodiment will be described. During operation in the eDRX mode, the UE needs to be granted eDRX by transmitting an eDRX-related parameter or indicator to the MME in every TAU/RAU. If operation in the eDRX mode corresponds to a more general scenario for the UE, requesting eDRX in every TAU/RAU is a burden to the network. For example, in an environment such as cellular IoT (cIoT), most UEs are likely to operate in the eDRX mode to save power, and it is expected that parameters which have been negotiated once will not frequently change.

Accordingly, in the following description, a method of continuing to use negotiated values if parameter change or stop of eDRX does not occur after negotiation of eDRX parameters is proposed. That is, a UE persistently operating in the eDRX mode automatically operates in the eDRX mode with the same parameters as long as there is no separate indication. According to this message, even if the existing message configuration is changed, the UE may be allowed to operate in the eDRX mode because the UE operates in the eDRX mode even if the UE receives a TAU/RAU reject message.

The method of this embodiment may be optionally performed according to negotiation between the network and the UE. For example, only if the aforementioned method is negotiated to be used in the first eDRX negotiation procedure, may the UE and the MME adopt the procedure described above.

In the embodiment above, if the UE desires to stop operating in the eDRX mode, the UE may transmit, through a TAU/RAU request message, an indicator indicating stop of the eDRX operation to the MME. The UE may immediately trigger the TAU/RAU request message to stop using eDRX. Herein, the indicator indicating stop of the eDRX operation may be configured using a separate IE (e.g., an eDRX termination IEEE) or may be configured as an additional bit in a predefined the field. Alternatively, setting all the eDRX parameters to "0" may also be used as an indicator indicating stop of the eDRX operation.

Upon receiving the indicator indicating stop of the eDRX, the MME may (explicitly) transmit an TAU/RAU grant message to the UE to explicitly instruct the UE to stop using eDRX. In contrast, the MME may implicitly instruct use of eDRX rather than including separate information in the TAU/RAU grant/reject message because the procedure of the transmitting the TAU/RAU grant/reject message itself means that the request for the stopping from the UE has been received. If the UE is off or the Subscriber Identification Module (SIM)/Universal SIM (USIM) is removed from the UE, all configurations of eDRX are initialized.

Figure 12:
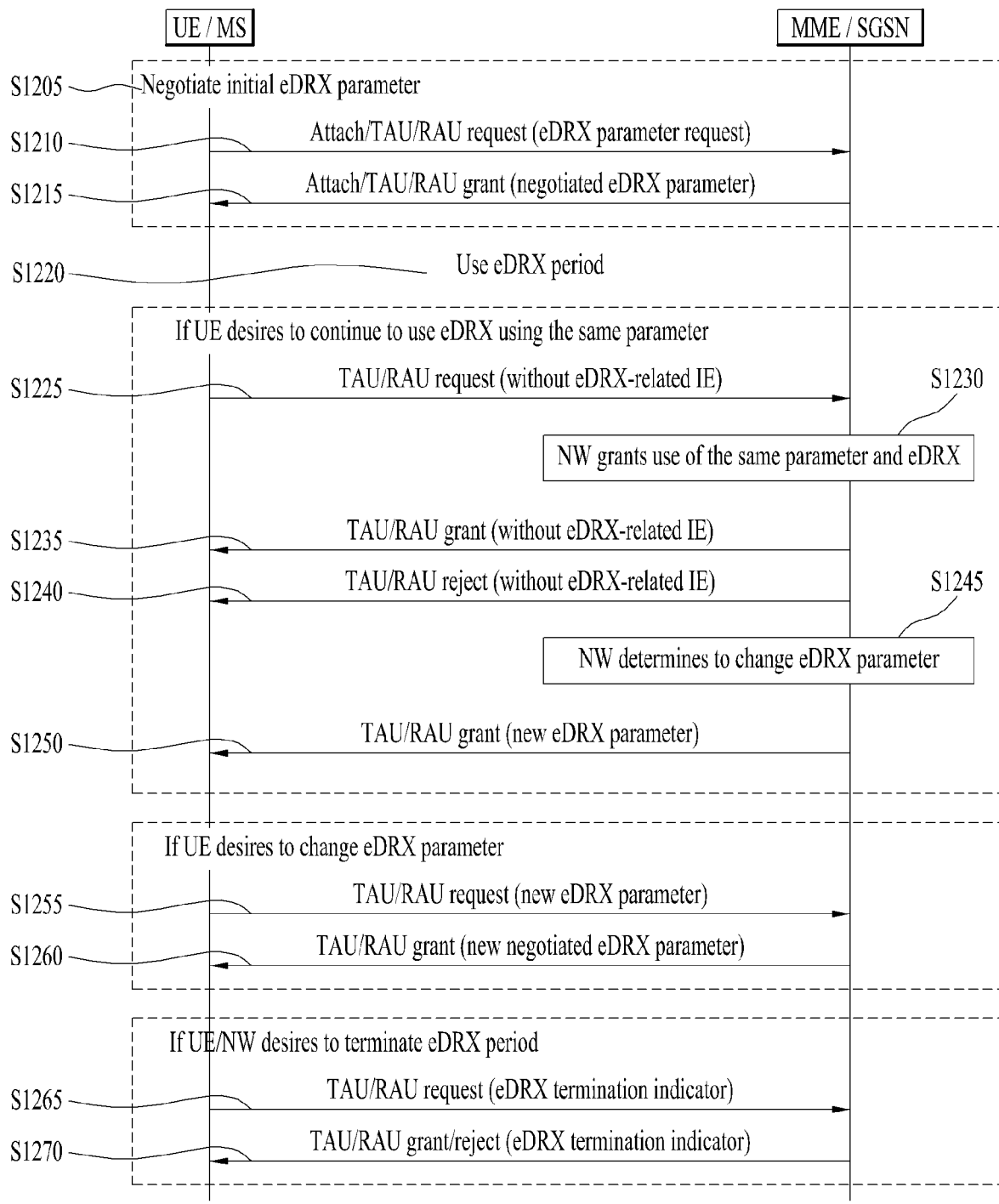

FIG. 12 illustrates the proposed embodiment according to a time series flow. Steps S1205 to S1220 are similar to S1105 to S1120, and thus a detailed description thereof will be omitted. In steps S1205 to S1220, it is assumed that "the eDRX operation shall be performed with the same parameter unless a separate instruction is given" is negotiated between the UE and the network.

If the UE desires to continue to use eDRX with the same parameters, namely, to use the previously negotiated parameters, the UE transmits a TAU/RAU request message to the MME without an eDRX-related additional IE (S1225). That is, the UE does not include any additional information in the TAU/RAU request message transmitted to the MME. The MME grants continuous operation in the eDRX mode to the UE as negotiated with the UE (S1230).

The MME transmits a TAU/RAU grant message or TAU/RAU reject message and does not include an eDRX-related parameter/indicator/IE in the message since the MME has no plan to add a new parameter in this operation (S1235, S1240). If the MME determines that the eDRX parameter needs to be changed (S1245), the MME transmits, to the UE, a TAU/RAU grant message containing a new eDRX parameter (S1250). Upon receiving the new eDRX parameter, the UE operates in the eDRX mode using the received parameter.

Meanwhile, if the UE desires to change the eDRX parameter, the UE negotiates a new eDRX parameter with the MME as in S1165 and S1170 of FIG. 11 (S1255, S1260). If the UE desires to terminate the eDRX period, namely if the UE desires to stop eDRX, the UE transmits, to the MME, a TAU/RAU request message containing an indicator indicating stop or termination of eDRX (S1265). Then, the MME transmits, to the UE, a TAU/RAU grant message or TAU/RAU reject message containing an indicator indicating stop or termination of eDRX in response (S1270). Alternatively, the MME may transmit, to the UE, only a TAU/RAU grant/reject message without the indicator indicating stop or termination of eDRX since the MME has already recognized the termination request from the UE.

4. Configuration of Apparatuses

Figure 13:
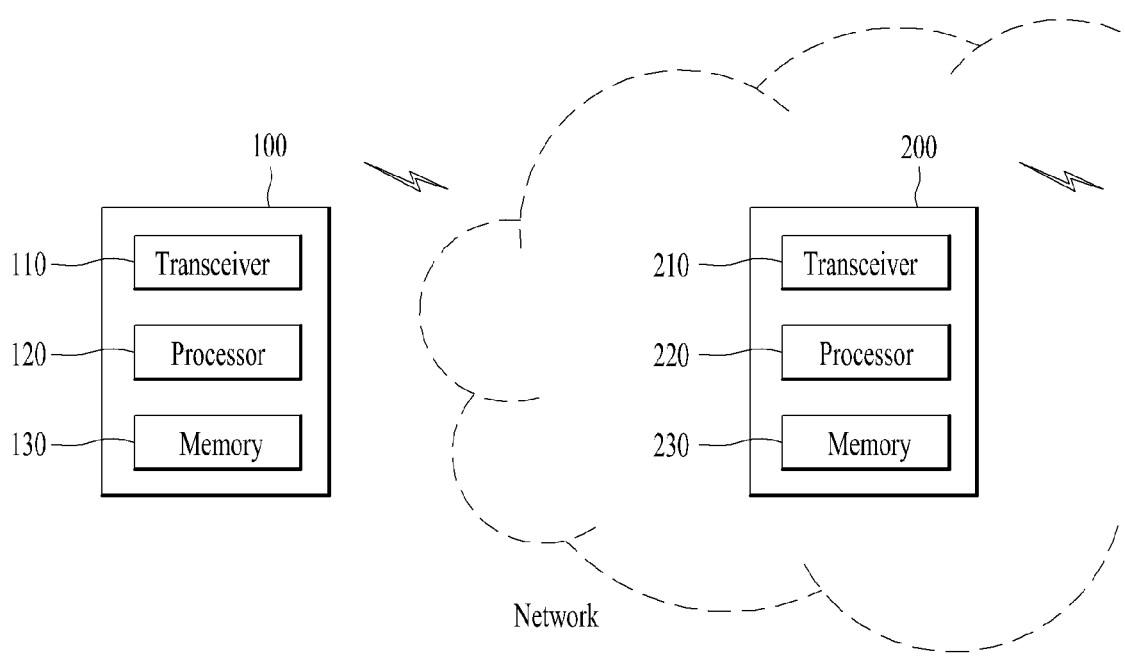
FIG. 13 illustrates configuration of node apparatuses according to a proposed embodiment.

FIG. 13 illustrates configuration of node apparatuses according to a proposed embodiment.

The UE 100 according to the proposed embodiment of the present invention may include a transceiver 110, a processor 120, and a memory 130. The transceiver 110 may be configured to transmit and receive various signals, data and information to and from an external device. Alternatively, the transceiver 110 may be implemented with a transmitter and a receiver which are separated from each other. The UE 100 may be connected to the external device by wire and/or wirelessly. The processor 120 may control overall operation of the UE 100, and be configured to calculate and process information for the UE 100 to transmit and receive to and from the external device. In addition, the processor 120 may be configured to perform the proposed operations of the UE. The memory 130 may store the calculated and processed information for a predetermined time, and may be replaced by another constituent such as a buffer (not shown).

Referring to FIG. 13, the network node 200 according to the proposed embodiment may include a transceiver 210, a processor 220 and a memory 230. The transceiver 210 may be configured to transmit and receive various signals, data and information to and from an external device. The network node 200 may be connected to the external device by wire and/or wirelessly. The transceiver 110 may be implemented with a transmitter and a receiver which are separated from each other. The processor 220 may control overall operation of the network node 200, and be configured to calculate and process information for the network node 200 to transmit and receive to and from the external device. In addition, the processor 220 may be configured to perform the proposed operations of the network node. The memory 230 may store the calculated and processed information for a predetermined time, and may be replaced by another constituent such as a buffer (not shown).

For configuration of the UE 100 and the network apparatus, the details described in various embodiments of the present invention may be independently applied or implemented such that two or more embodiments are simultaneously applied. For simplicity, redundant description is omitted.

The embodiments of the present invention may be implemented through various means. For example, the embodiments may be implemented by hardware, firmware, software, or a combination thereof.

When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to embodiments of the present invention may be embodied as an apparatus, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention disclosed in the appended claims. Thus, the present invention is not intended to be limited to the embodiments described herein, but is intended to accord with the widest scope corresponding to the principles and novel features disclosed herein.

INDUSTRIAL APPLICABILITY

As described above, an operation method for a UE in the idle mode is applicable not only to the 3GPP system but also to various wireless communication systems including IEEE 802.16x and 802.11x systems. Further, the proposed method is applicable to the mmWave communication system which uses a super-high frequency band.

The invention claimed is:
1. A method of a user equipment (UE) operating in an extended discontinuous reception (eDRX) mode in an idle mode, the method comprising:

transmitting, by the UE to a network entity, a Tracking Area Update (TAU) request message comprising eDRX information for requesting operation in the eDRX mode;

based on the network entity being in a congested state, receiving, by the UE from the network entity, a TAU reject message in response to the TAU request message, wherein the TAU reject message comprises information informing the UE that the network entity is in the congested state and a time value for retransmitting the TAU request message;

based on determination that the network entity grants the eDRX mode for the UE based on the TAU reject message comprising an eDRX parameter for operating in the eDRX mode, performing, by the UE, a first operation related to the eDRX mode, based on the eDRX parameter; and based on determination that the network entity rejects the eDRX mode for the UE based on the TAU reject message not comprising the eDRX parameter, performing, by the UE, a second operation other than the eDRX mode.

2. The method of claim 1, wherein the operation related to the eDRX mode is performed, along with an initiation of a timer T3346, based on the time value.

3. The method of claim 1, wherein when operating in the eDRX mode is pre-negotiated with the network entity before the TAU request message is transmitted, the eDRX information comprises an indicator for requesting that a negotiated parameter be continuously used.

4. The method of claim 1, wherein the UE performs the operation related to the eDRX mode by initiating the operation in the eDRX mode based on determining that integrity protection is applied to the TAU reject message.

5. The method of claim 1, further comprising:
based on determination that the eDRX mode is desired to be stopped during the operation related to the eDRX mode, transmitting a message comprising an indicator requesting the eDRX mode be stopped to the network entity.

6. A user equipment (UE) operating in an extended discontinuous reception (eDRX) mode of an idle mode, the UE comprising:

a transmitter;
a receiver; and
a processor, operably coupled to the transmitter and the receiver, wherein the processor is configured to:
control the transmitter to transmit, to a network entity, a Tracking Area Update (TAU) request message comprising eDRX information for requesting operation in the eDRX mode;
based on the network entity being in a congested state, control the receiver to receive, from the network entity, a TAU reject message in response to the TAU request message,
wherein the TAU reject message comprises information informing the UE that the network entity is in the congested state and a time value for retransmitting the TAU request message;
based on determination that the network entity grants the eDRX mode for the UE based on the TAU reject message comprising an eDRX parameter for operating in the eDRX mode, perform a first operation related to the eDRX mode, based on the eDRX parameter; and
based on determination that the network entity rejects the eDRX mode for the UE based on the TAU reject message not comprising the eDRX parameter, perform a second operation other than the eDRX mode.

7. The UE of claim 6, wherein the operation related to the eDRX mode is performed, along with an initiation of a timer T3346, according to the time value.

8. The UE of claim 6, wherein when operating in the eDRX mode is pre-negotiated with the network entity before the TAU request message is transmitted, the eDRX information comprises an indicator for requesting that a negotiated parameter be continuously used.

9. The UE of claim 6, wherein the processor performs the operation related to the eDRX mode by initiating the operation in the eDRX mode based on determining that integrity protection is applied to the TAU reject message.

10. The UE of claim 6, wherein based on determination that the eDRX mode is desired to be stopped during the operation in the eDRX mode, the processor is configured to transmit a third message comprising an indicator requesting the eDRX mode be stopped to the network entity.

* * * * *